Patented Sept. 7, 1948

2,448,870

UNITED STATES PATENT OFFICE 2,448,870

AZO COMPOUNDS CONTAINING A TRIAZOLE NUCLEUS

Joseph B. Dickey, Rochester, N. Y., and James G. McNally, Kingsport, Tenn., assignors to Eastman Kodak Company, Rochester, N. Y., a corporation of New Jersey No Drawing. Application December 15, 1945, Serial No. 635,406

2 Claims. (Cl. 260—157)

This invention relates to azo compounds containing a benzotriazole or a naphthotriazole nucleus, and to a process for the preparation thereof.

Azo compounds containing a hydroxylated pseudonaphthazimide nucleus of the following formula:

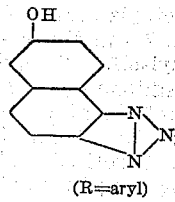

(R=aryl)

are known. These azo compounds, in caustic alkaline liquor, have an affinity for cellulosic fibers, such as cotton, hemp, ramie and artificial silk from regenerated cellulose. The compounds, however, have very low affinity for cellulose carboxylic ester fibers.

We have now found, however, that azo compounds containing a 1,2,3-benzotriazole:

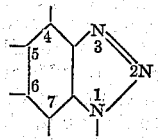

or a 1,2,3-β-naphthotriazole (1,2,3-[2,3]-naphthotriazole):

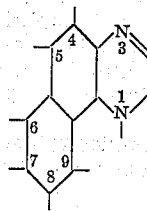

nucleus devoid of aryl groups in the 1-position have a high affinity for cellulose carboxylic esters.

Our new azo dye compounds can be represented by the following formulas:

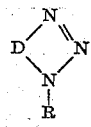

and

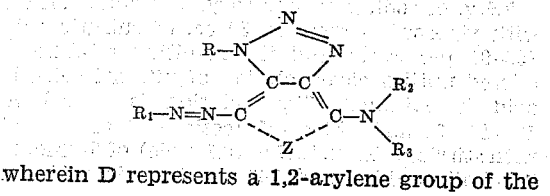

wherein D represents a 1,2-arylene group of the benzene or naphthalene series containing in the para position to the $$-\underset{\underset{R}{|}}{N}-$$

group an arylazo group of the benzene or naphthalene series, R represents hydrogen, an aliphatic group or a furfuryl group, $R_1$ represents an aryl group of the benzene or naphthalene series, $R_2$ represents hydrogen, an aliphatic group or a furfuryl group, $R_3$ represents an aliphatic group, and Z represents the non-metallic atoms necessary to complete an aryl nucleus of the benzene series or an aryl nucleus of the naphthalene series.

The aliphatic group can be, for example, an alkyl group such as methyl, ethyl, propyl or butyl, a hydroxyalkyl group such as β-hydroxyethyl, β-hydroxypropyl, β,γ-dihydroxypropyl, γ-hydroxypropyl or 4,5-dihydroxyamyl, an alkoxyalkyl group such as β-methoxyethyl or β-ethoxyethyl, a sulfoalkyl group such as β-sulfoethyl or γ-sulfopropyl, a sulfatoalkyl group such as β-sulfatoethyl or γ-sulfatopropyl, an acid ester of phosphorus group such as β-phosphatoethyl $$\left(-CH_2CH_2-O-P{\overset{OH}{\underset{OH}{\overset{\displaystyle\nearrow}{\searrow}}}}=O\right)$$

γ-phosphatopropyl, methoxy-β-phosphatoethyl $$\left(-CH_2CH_2-O-P{\overset{OCH_3}{\underset{OH}{\overset{\displaystyle\nearrow}{\searrow}}}}=O\right)$$

β-phosphitoethyl $$\left(-CH_2CH_2O-P{\overset{OH}{\underset{OH}{\overset{\displaystyle\nearrow}{\searrow}}}}\right)$$

ω-phosphito-n-butyl or diethoxy-β-phosphitoethyl $$\left(-CH_2CH_2-O-P{\overset{OC_2H_5}{\underset{OC_2H_5}{\overset{\displaystyle\nearrow}{\searrow}}}}\right)$$

a carboxyalkyl group such as β-carboxyethyl or delta-carboxybutyl, an aliphatic acyl radical such as acetyl, propionyl or butyryl and an unsaturated hydrocarbon group such as allyl or crotonyl.

While our invention is directed primarily to nuclear non-sulfonated azo compounds, it includes sulfonated as well as non-sulfonated azo compounds. For the dyeing of cellulose carboxylic esters, the nuclear non-sulfonated azo compounds of the invention should be employed. These compounds are likewise suitable for the coloration of silk, wool and nylon textile materials. The nuclear sulfonated compounds of our invention have little or no utility for the dyeing of cellulose carboxylic esters but can be employed to color wool, cotton, silk and nylon textile materials.

It is an object of our invention accordingly to provide new azo compounds and a process for the preparation thereof. Another object of our invention is to provide new nuclear non-sulfonated azo compounds possessing utility for the coloration of cellulose carboxylic ester textile materials. A further object is to provide new azo compounds suitable for the coloration of wool, silk, cotton and nylon materials. Other objects will become apparent hereinafter.

In accordance with our invention, we prepare our new azo dye compounds by coupling a diazotized primary aromatic amine of the benzene or naphthalene series with a 1,2,3-benzotriazole or a 1,2,3-β-naphthotriazole coupling component of the following formula:

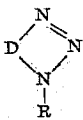

wherein D represents a 1,2-arylene group of the benzene or naphthalene series having attached to the carbon atom in the para position to the

group only a hydrogen atom or with a 1,2,3-benzotriazole or a 1,2,3-[2,3]-naphthotriazole coupling component of the following formula:

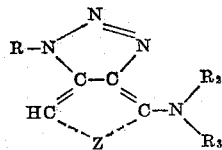

The members R, R2, R3 and Z appearing in the formulas just given have the meaning previously assigned to them.

Typical of the coupling components used in the preparation of the azo compounds of our invention are 1,2,3-benzotriazole, 1-methyl-1,2,3-benzotriazole, 1 - (β - hydroxyethyl)-7-methyl-1,2,3 - benzotriazole, 1-(β,γ-dihydroxypropyl)-1,2,3 - benzotriazole, 1 - (β-hydroxypropyl)-7-methyl - 1,2,3 - benzotriazole, 1-β,γ-dihydroxypropyl) - 7 - methoxy-4-methyl-1,2,3-benzotriazole, 1 - (β.γ - dihydroxypropyl)-4-acetamino-1,2,3 - benzotriazole, 4-di-β-hydroxyethylamino-1,2,3-benzotriazole, 1-acetyl-4-di-β-hydroxyethylamino-1,2,3-benzotriazole, 4-β,γ-dihydroxypropylamino - 1,2,3-benzotriazole, 4-γ-hydroxypropylamino - 1,2,3-benzotriazole, 1-allyl-1,2,3-benzotriazole, 1 - crotonyl - 1,2,3-benzotriazole, 1-(γ-ketobutyl) - 7-methoxy-4-methyl-1,2,3-benzotriazole, 1 - (β-sulfatoethyl)-4-lactylamino-1,2,3-benzotriazole ammonium salt, 1-(β,γ-dihydroxypropyl)-1,2,3 - β - naphthotriazole, 1-(β,γ-dihydroxypropyl)-7-hydroxy-1,2,3-β-naphthotriazole, 1-(β-hydroxyethyl)-1,2,3-β-naphthotriazole, 1-γ-hydroxypropyl - 1,2,3-β-naphthotriazole, 1-allyl-1,2,3-β-naphthotriazole, 4-allylamino-1,2,3-β-naphthotriazole and 4-allylamino-1,2,3-β-naphthotriazole.

Typical of the primary aromatic amines which are diazotized and coupled with the triazole coupling components in accordance with our invention are: p-nitroaniline, o-chloro-p-nitroaniline, o-bromo-p-nitroaniline, o-fluoro-p-nitroaniline, o - cyan-p-nitroaniline, o-methylsulfonyl-p-nitroaniline, o - acetyl-p-nitroaniline, o-(N-ethylsulfamyl) - p - nitroaniline, o-methyl-p-nitroaniline, o-methoxy-p-nitroaniline, 2,6-dichloro-4-nitroaniline, o-nitroaniline, o-nitro-p-chloro-4-nitroaniline, o - nitro-p - fluoroaniline, 2,4-dinitroaniline, 6 - trifluoromethyl-2,4-dinitroaniline, 6-chloro - 2,4-dinitroaniline, 6-bromo-2,4-dinitroaniline, 6-iodo-2,4-dinitroaniline, 6-hydroxy-2,4-dinitroaniline, 6-fluoro-2,4-dinitroaniline, 2,4-dinitro - 6 - (N-methylsulfamyl)-aniline, 6-acetyl-2,4-dinitroaniline, 6-cyano-2,4-dinitroaniline, 6-methyl - 2,4-dinitroaniline, 6-methoxy-2,4-dinitroaniline, p-aminoacetophenone, p-toluidine, m-toluidine, o-toluidine, p-aminoacetanilide, m-trifluoromethylaniline, 3-chloro-6-methoxyaniline, 4 - chloro - 3 - trifluoromethylaniline, p-trifluoromethylaniline, 2-nitro-4-trifluoromethylaniline, 4 - nitro-2-trifluoromethylaniline, 2,4-dinitro-6-ethoxyaniline, 1-amino-2,4-di-(trifluoromethyl)-benzene, ortho-trifluoromethylaniline, aniline, 2-chloro-4-trifluoromethylaniline, 2-hydroxy-4-trifluoromethylaniline, 2 - methoxy - 4 - trifluoromethylaniline, 2-ethylsulfamyl-4-trifluoromethylaniline, 2 - methylsulfone - 4 - trifluoromethylaniline, alpha-naphthylamine and 4-nitro-1-aminonaphthalene. All of the foregoing primary amines when diazotized and coupled with the triazole coupling compounds give azo dyes of use in the coloration of cellulose carboxylic ester textiles, in the coloration of nylon textiles, in the coloration of cellulose carboxylic ester plastics, and in the coloration of polyvinyl plastics. The azo compounds thus obtained also possess some utility for the coloration of silk and wool textile materials.

Typical of the primary aromatic amines which can be diazotized and coupled with the triazole components to give azo dyes useful in the coloration of silk textiles, wool textiles, nylon textiles and cotton textiles are p-sulfanilic acid, 2-amino-5-nitrobenzene sulfonic acid, 2-amino-3,5-dinitrobenzene sulfonic acid, 3-chloro-4-aminobenzene sulfonic acid, dianisidine disulfonic acid, 1 - amino - 8 - naphthol-2,4-disulfonic acid, 1-amino-2-naphthol-5-sulfonic acid, 1-naphthylamine-4-sulfonic acid, 1-naphthylamine-2,4-disulfonic acid, 2-naphthylamine-8-sulfonic acid, 1-naphthylamine-5-sulfonic acid, 1-naphthylamine-6-sulfonic acid and 1-naphthylamine-4,8-disulfonic acid.

The following examples will serve to illustrate our new azo compounds and the manner of obtaining the same.

*Example 1.—5-(6-chloro-2,4-dinitrophenylazo)-1-β,γ-dihydroxypropyl-6-acetamino-1,2,3-benzotriazole*

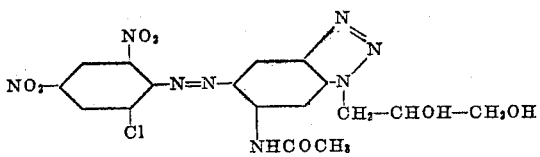

7.6 g. of sodium nitrite (dry) are added slowly with vigorous stirring to 50 cc. of sulfuric acid (95–96 per cent) and the resulting mixture is stirred until a clear solution of nitrosyl sulfuric acid is obtained. The solution is cooled to 12°–14° C. and 120 g. of acetic acid are added with stirring. Then 21.7 g. (0.1 mole) of 6-chloro-2,4-dinitroaniline and 100 g. of acetic acid are added to the mixture simultaneously with stirring at 15° C. and stirring is continued at 15° C. for 2 hours. Urea is then added to destroy any excess nitrous acid and stirring is continued for ½ hour. The resulting diazo solution is poured onto 1,000 g. of ice. The resulting iced solution is added to a cold dilute hydrochloric acid solution of 1-β,γ-dihydroxypropyl-6-acetamino-1,2,3-benzotriazole. Coupling is completed by adding sodium acetate until the mineral acid is practically neutralized. The dye compound formed is recovered by filtration, washed with water and then dried. It colors cellulose acetate rayon textiles blue, from an aqueous suspension of the dye.

*Example 2.—5-(2,4-dinitro-6-N-ethylsulfamylphenylazo)-1-(β,γ-dihydroxypropyl)-1,2,3-benzotriazole*

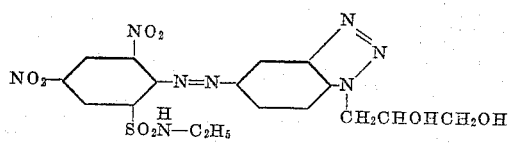

29.2 grams of 1-amino-2,4-dinitro-6-N-ethylsulfamylbenzene are diazotized at a temperature of 0°-5° C. with nitrosyl sulfuric acid in known fashion. The diazonium solution resulting is poured into water and the insoluble diazo compound which precipitates out is recovered by filtration and then dissolved in acetic acid.

The diazo solution prepared as described above is added to a cold, dilute hydrochloric acid solution of 19.3 grams of 1-β,γ-dihydroxypropyl-1,2,3-benzotriazole. The coupling reaction which takes place is completed by adding sodium acetate until the reaction mixture is neutral to Congo red paper. The dye compound formed is recovered by filtration, washed with water and then dried. It colors cellulose acetate rayon blue shades.

*Example 3.—5-(2,4-dinitro-6-N-ethylsulfamylphenylazo)-1-(β,γ-dihydroxypropyl)-6-acetamino-1,2,3-benzotriazole*

29.2 grams of 1-amino-2,4-dinitro-6-N-ethylsulfamylbenzene are diazotized and the diazonium compound obtained is coupled in a cold, dilute hydrochloric acid solution of 25 grams of 1-β,γ-dihydroxypropyl-6-acetamino-1,2,3-benzotriazole. The diazotization, coupling and dye recovery operations can be carried out in accordance with the procedure described in Example 2. The dye compound obtained colors cellulose acetate rayon blue shades.

*Example 4.—5-(p-acetylphenylazo)-1-methyl-1,2,3-benzotriazole*

13.5 grams of p-aminoacetophenone are diazotized in known fashion and the diazonium compound obtained is coupled with 13.2 grams of 1-methyl-1,2,3-benzotriazole. Coupling and recovery of the dye compound formed can be carried out in accordance with the procedure described in Example 2. The dye compound obtained colors cellulose acetate rayon orange shades.

*Example 5.—1-β-hydroxyethyl-5-(p-methylsulfonylphenylazo)-6-methyl-1,2,3-benzotriazole*

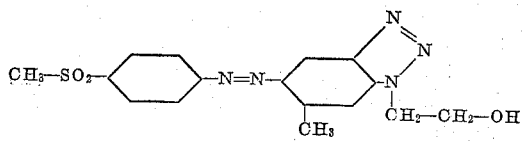

17.1 grams of p-aminophenylmethylsulfone are diazotized in known fashion and the diazonium compound obtained is coupled in a cold, dilute hydrochloric acid solution of 17.6 grams of 1-β-hydroxyethyl-6-methyl-1,2,3-benzotriazole. The dye compound formed is recovered by filtration, washed with water and then dried. It colors cellulose acetate rayon red shades.

*Example 6.—1-(β,γ-dihydroxypropyl)-5-(p-nitrophenylazo)-1,2,3-benzotriazole*

13.8 grams of p-nitroaniline are diazotized in known fashion and the diazonium compound obtained is coupled in a cold, dilute hydrochloric acid solution of 19.2 grams of 1-β,γ-dihydroxypropyl-1,2,3-benzotriazole. The dye compound formed is recovered by filtration, washed with water and then dried. It colors cellulose acetate rayon red shades.

*Example 7.—5-(o-chloro-p-nitrophenylazo)-1-(β-hydroxypropyl)-6-methyl-1,2,3-benzotriazole*

17.3 grams of o-chloro p-nitroaniline are diazotized in known fashion and the diazonium compound obtained is coupled in a cold, dilute hydrochloric acid solution of 19.0 grams of 1-β-hydroxypropyl-6-methyl-1,2,3-benzotriazole. The dye compound formed is recovered by filtration, washed with water and then dried. It colors cellulose acetate rayon rubine shades.

*Example 8.—1-(β,γ-dihydroxypropyl)-7-methoxy-4-methyl-5-(2,4-dinitrophenylazo)-1,2,3-benzotriazole*

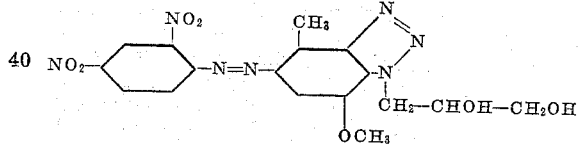

18.3 grams of 2,4-dinitroaniline are diazotized in a mixture of nitrosyl sulfuric acid and acetic acid and then poured onto ice. The diazonium solution resulting is then added to a cold, dilute hydrochloric acid solution of 23.6 grams of 1-β,γ-dihydroxypropyl-7-methoxy-4-methyl-1,2,3-benzotriazole. The dye compound formed is recovered by filtration, washed with water and then dried. It colors cellulose acetate rayon violet shades.

*Example 9.—7-acetamino-1-(β,γ-dihydroxypropyl)-5-(6-chloro-2,4-dinitrophenylazo)-1,2,3-benzotriazole*

21.7 grams of 2,4-dinitro-6-chloroaniline are diazotized in accordance with the procedure described in Example 1 and the diazonium solution resulting is poured onto ice. The resulting iced solution is added to a cold, dilute hydrochloric acid solution of 28.3 grams of 7-acetamino-1-β,γ-dihydroxypropyl-1,2,3-benzotriazole. The dye compound formed is recovered by filtration, washed with water and then dried. It colors cellulose acetate rayon blue shades.

*Example 10.—1-(β,γ-dihydroxypropyl)-4-methyl-5-(2,4-dinitro-6-N-ethylsulfamylphenylazo)-1,2,3-benzotriazole*

29.2 grams of 1-amino-2,4-dinitro-6-N-ethylsulfamylbenzene are diazotized with nitrosyl sulfuric acid in accordance with the procedure described in Example 2. The diazonium compound obtained is added to a cold, dilute hydrochloric acid solution of 20.6 grams of 1-β,γ-dihydroxypropyl-4-methyl-1,2,3-benzotriazole. The dye compound formed is recovered by filtration, washed with water and then dried. It colors cellulose acetate rayon blue shades.

*Example 11.—5-(2-fluoro-4-nitrophenylazo)-1-γ-ketobutyl - 4 - methoxy-6-methyl-1,2,3-benzotriazole*

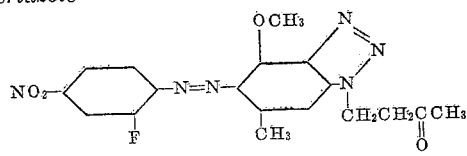

15.6 grams of o-fluoro-p-nitroaniline are diazotized in known fashion and the diazonium compound obtained is coupled in a cold, dilute hydrochloric acid solution of 23.2 grams of 1-γ-ketobutyl-4-methoxy - 6 - methyl-1,2,3-benzotriazole. The dye compound formed is recovered by filtration, washed with water and then dried. It colors cellulose acetate rayon rubine shades.

*Example 12.—1-ammonium sulfatoethyl-4-lactylamino-5-(2,4 - dinitro-6-methylsulfonlyphenlyazo)-1,2,3-benzotriazole*

23.1 grams of 2-amino-3,5-dinitrophenylmethylsulfone are diazotized and the diazonium compound obtained is coupled in accordance with the procedure described in Example 9 with 33.1 grams of 1-ammonium sulfatoethyl-4-lactylamino-1,2,3-benzotriazole. The dye compound formed is recovered by filtration, washed with water and then dried. If desired, a salt such as sodium chloride can be added to the reaction mixture to facilitate precipitation of the dye compound. It colors cellulose acetate rayon, silk, wool and nylon blue shades.

*Example 13.—5 - [(4 - phenylazo)phenylazo]-7-chloro-4-ethyl-1 - β - sulfoethyl - 1,2,3 - benzotriazole*

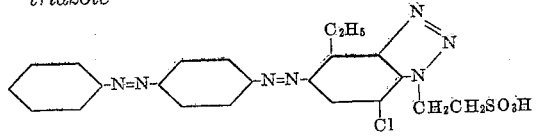

20.9 grams of p-aminoazobenzene are diazotized in known fashion and the diazonium compound obtained is coupled with 28.8 grams of 7-chloro - 4 - ethyl-1-β-sulfoethyl - 1,2,3 - benzotriazole in a cold, dilute hydrochloric acid medium. The dye compound formed is precipitated from the reaction mixture by adding sodium chloride, recovered by filtration and then dried. It colors cellulose actate rayon, silk, wool, and nylon, orange-red shades.

*Example 14.—5 - (6-carboxyl-2,4-dinitrophenylazo) - 6 - hydroxy - 1 - β - methoxyethyl-1,2,3-[2,3]-naphthotriazole*

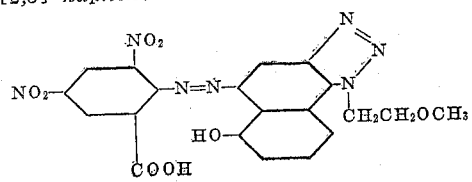

22.7 grams of 2-amino-3,5-dinitrobenzoic acid are diazotized in accordance with the procedure described in Example 8. The diazonium compound obtained is coupled with 24.5 grams of 6-hydroxy-1-β-methoxyethyl-1,2,3-(2,3) - naphthotriazole in a cold, dilute hydrochloric acid medium. The dye compound formed is recovered by filtration, washed with water and then dried. It colors cellulose acetate rayon, wool, silk and nylon, blue shades.

*Example 15.—5-(4-nitro - 2 - sulfonicphenlyazo)-1 - tetrahydrofurfuryl - 1,2,3 - [2,3] - naphthotriazole*

21.8 grams of 1-amino-4-nitro-2-sulfonicbenzene are diazotized in known fashion and the diazonium compound obtained is coupled with 24.5 grams of 1 - tetrahydrofurfuryl - 1,2,3-[2,3]-naphthotriazole in a cold, dilute hydrochloric acid medium. The dye compound formed is recovered by filtration, washed with water and then dried. It colors silk, wool and nylon violet shades.

*Example 16.—5-(1-amino-2-hydroxy-5-sulfonicnaphthalene) - 1 - allyl - 4-hydroxy-6-sulfonic-1,2,3-[2,3]-naphthotriazole*

23.9 grams of 1-amino-2-naphthol-5-sulfonic acid are diazotized in known fashion and the diazonium compound obtained is coupled in an alkaline medium with 30.7 grams of 1-allyl-4-hydroxy-6-sulfonic - 1,2,3-[2,3]-naphthotriazole. The dye compound colors silk, wool, cotton, viscose and nylon, red shades.

*Example 17.—7 - (4 - nitro - 2 - acetophenylazo) - 4 - β,γ - dihydroxypropylamino - 1,2,3 - benzotriazole*

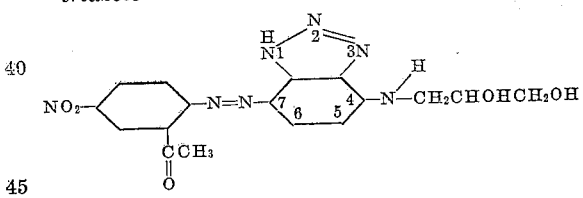

18.0 grams of 1-amino-2-aceto-4-nitrobenzene are diazotized in known fashion and the diazonium compound obtained is coupled with 21.8 grams of 4-β,γ-dihydroxypropylamino-1,2,3-benzotriazole in a cold, dilute hydrochloric acid medium. The dye compound formed is recovered by filtration, washed with water and then dried. The dye compound obtained colors cellulose acetate rayon rubine shades.

*Example 18.—1-β-hydroxyethyl-4-(N,N-di-β-hydroxyethyl) - 7 - (2 - methylsulfone -4- nitrophenylazo)-1,2,3-benzotriazole*

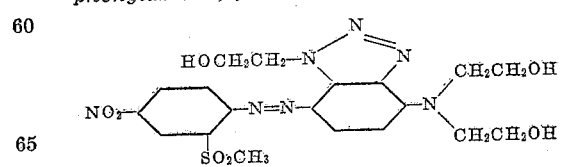

21.6 grams of 2-amino-5-nitrophenylmethylsulfone are diazotized and the diazonium compound obtained is coupled with 26.7 grams of 1-β-hydroxyethyl - 4 - (N,N-di-β-hydroxyethyl)-1,2,3-benzotriazole in a cold, dilute, aqueous hydrochloric acid medium. The dye compound formed is recovered by filtration, washed with water and dried. It colors cellulose acetate rayon violet shades.

*Example 19.—4-(N-β-hydroxyethyl)-9-(4-nitrophenylazo)-1,2,3-[2,3]-naphthotriazole*

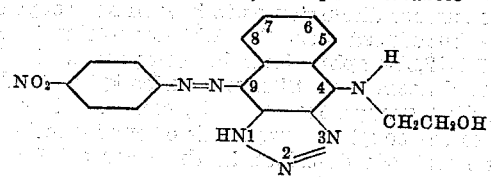

13.8 grams of p-nitroaniline are diazotized in known fashion and the diazonium compound obtained is coupled with 23.0 grams of 4-(N-β-hydroxyethyl)-1,2,3-[2,3]-naphthotriazole in a cold, dilute, aqueous hydrochloric acid medium. The dye compound formed is recovered by filtration, washed with water and dried. It colors cellulose acetate rayon orange shades.

Following the procedure described hereinbefore the compounds indicated hereinafter can be prepared by diazotizing the amines listed under the heading "Amine" and coupling the diazonium compounds obtained with the compounds specified in the column entitled "Coupling component." The colors given are those obtained on the materials the compounds are adapted to color.

nitro-1,2,3-benzotriazole, 1,2-diamino-3-methoxy-6-methylbenzene gives principally 4-methyl-7-methoxy-1,2,3-benzotriazole, 1,2-diamino-4-nitrobenzene gives principally 6-nitro-1,2,3-benzotriazole, 1,2-diamino-4-methylbenzene gives principally 6-methyl-1,2,3-benzotriazole, etc. 1,2-Diaminonaphthalenes react similarly with nitrous acid to give 1,2,3-β-naphthotriazoles. Thus 1,2-diaminonaphthalene gives 1,2,3-β-naphthotriazole, 1,2-diamino-6-hydroxynaphthalene gives 7-hydroxy-1,2,3-β-naphthotriazole of the following formula:

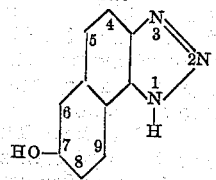

To obtain the 1,2,3-benzotriazoles and 1,2,3-β-naphthotriazoles substituted in the 1-position with an aliphatic radical, the 1,2,3-benzotriazoles and 1,2,3-β-naphthotriazoles are heated with the appropriate organic halide, in the presence of an acid-binding agent. Thus to prepare 1-(β,γ-dihydroxypropyl)-1,2,3-benzotriazole, 129 g. (1

| Amine | Coupling Component | Color |
| --- | --- | --- |
| 2,4-dinitroaniline | 1-methyl-4-N-carboxamide-6-[(β,-γ-dihydroxypropyl)-ethyl]-amino-1,2,3-benzotriazole. | blue. |
| 2,4-dinitro-6-chloroaniline | 1-acetyl-4-β,-γ-dihydroxy-propylamino-5-ethoxy-1,2,3-benzotriazole | Do. |
| 1-amino-2,4-dinitro-6-N-ethylsulfamyl-benzene | 1-acetyl-4-di-β-hydroxy-ethylamino-6-methyl-1,2,3-benzotriazole | Do. |
| 1-naphthylamine-2,4-disulfonic acid | 1-ethyl-4-diethylamino-6-hydroxy-1,2,3-benzotriazole | violet. |
| o-chloro-p-nitroaniline | 1-phosphatoethyl-4-n-butylamino-6-methoxy-1,2,3-benzotriazole | rubine. |
| p-aminoacetophenone | 1-allyl-1,2,3-benzotriazole | |
| Do | 1-acetyl-1,2,3-benzotriazole | |
| Do | 1,2,3-benzotriazole | orange |
| 2-cyano-4-nitroaniline | 1-β-methoxyethyl-1,2,3-benzotriazole | Do. |
| p-nitroaniline | 1-β-carboxyethyl-1,2,3-benzotriazole | rubine. |
| p-sulfanilic acid | 1-n-butyl-1,2,3-benzotriazole | red. |
| p-trifluoromethylaniline | 1-tetrahydrofurfuryl-1,2,3-benzotriazole | orange |
| o-trifluoromethylaniline | 1-β-phosphatoethyl-6-acetamino-1,2,3-benzotriazole | yellow. |
| 4-cyano-2-nitroaniline | 1-crotonyl-1,2,3-benzotriazole | Do. |
| Do | 4-β-ethoxyethylamino-1,2,3-benzotriazole | rubine. |
| p-nitroaniline | 4-allylamino-1,2,3-benzotriazole | Do. |
| Do | 4-acetylamino-1,2,3-benzotriazole | red. |
| Do | 4-tetrahydrofurfurylamino-1,2,3-benzotriazole | Do. |
| Do | 4-(methoxy-β-phosphatoethyl)amino-1,2,3-benzotriazole | Do. |
| Do | 1-acetyl-4-(H/N—CH₂CONH₂)-1,2,3-[2,3]-naphthotriazole | Do. |
| Do | 4-allylamino-1,2,3-[2,3]-naphthotriazole | Do. |
| 6-hydroxy-2,4-dinitroaniline | 4-β,γ-dihydroxypropylamino-1,2,3-[2,3]-naphthotriazole | Do. |
| 1-amino-8-naphthol-2,4-disulfonic acid | 1-β-hydroxyethyl-4-di-β-hydroxyethylamino-1,2,3-[2,3]-naphthotriazole | blue. |
| 1-naphthylamine-4,8-disulfonic acid | 1-β-hydroxyethyl-4-delta-hydroxybutylamino-1,2,3-[2,3]-naphthotriazole | violet. |
| p-aminoacetophenone | 1,2,3-[2,3]-naphthotriazole | Do. |
| 4-nitro-2-trifluoromethylaniline | 1-β,γ-dihydroxypropyl-1,2,3-[2,3]-naphthotriazole | orange. |
| 2,4-dinitro-6-trifluoromethylaniline | 1-n-butyl-1,2,3-[2,3]-naphthotriazole | violet. |
| 2-chloro-4-trifluoromethylaniline | 1-β-ketopropyl-1,2,3-[2,3]-naphthotriazole | green. |
| 2-methyl-4-trifluoromethylaniline | 1-β-phosphitoethyl-1,2,3-[2,3]-naphthotriazole | orange |
| p-nitroaniline | 4-butyrylamino-1,2,3-[2,3]-naphthotriazole | Do. |
| Do | γ-ketopropylamino-1,2,3-[2,3]-naphthotriazole | rubine. |
| p-aminoacetophenone | 1-acetyl-1,2,3-[2,3]-naphthotriazole | red. |

The foregoing examples are intended to be illustrative and not limitative of our invention as the diazo derivatives of any of the amines indicated hereinbefore can be coupled with any of the benzotriazole and naphthotriazole coupling component shown herein to yield compounds of the invention. Also while certain of the compounds have been described more particularly with reference to the color they produce on cellulose acetate rayon, it will be understood that they color other organic derivatives of cellulose, as well as nylon, silk and wool, a generally similar color.

The 1,2,3-benzotriazoles employed in practicing our invention can be prepared in known manner by the action of nitrous acid on 1,2-phenylenediamines (see, for example, Organic Syntheses, 20, 16). o-Phenylenediamine gives 1,2,3-benzotriazole, 1,2-diamino-3,6-dimethylbenzene gives 4,7-dimethyl-1,2,3-benzotriazole, 1,2-diamino-3-nitrobenzene gives principally 4- mole) of 1,2,3-benzotriazole is heated on a steam bath with 121 g. (1.1 moles) of glycerol-α-monochlorohydrin and 117 g. (1.1 moles) of sodium carbonate with stirring for 10 hours. The reaction mixture is cooled and ethyl alcohol is added. The mixture is then filtered to remove the salt. The alcohol is removed from the filtrate by distillation leaving a residue of 1-(β,γ-dihydroxypropyl)-1,2,3-benzotriazole which can be distilled under reduced pressure. To introduce the β-hydroxyethyl group, ethylene chlorohydrin is employed, propylene cholohydrin for the β-hydroxypropyl group, ethyl bromide for the ethyl group (reaction carried out in a sealed tube in this case), acetyl chloride for the acetyl group, allyl chloride (3-chloropropylene) for the alkyl group, etc. Similarly tetrahydrofurfuryl chloride is used to introduce the tetrahydrofurfuryl group.

To obtain 1,2,3-benzotriazoles containing an acylamino group in the benzene nucleus, the corresponding nitro-1,2,3-benzotriazole is first prepared as described above. Then, if an aliphatic radical or a furfuryl radical in the 1-position is desired, it is introduced, and the resulting nitro compound is reduced to the corresponding amino compound with hydrogen, in methanol, using a nickel catalyst of the Raney type, under 60 to 500 pounds pressure, at 20 to 25° C. The resulting amino compound is then acylated in the cold. Thus, 6-acetamino-1-(β,γ-dihydroxypropyl)-1,2,3-benzotriazole is prepared from 6-nitro-1-(β,γ-dihydroxypropyl)-1,2,3 - benzotriazole by reduction to 6-amino-1-(β,γ-dihydroxypropyl)-1,2,3-benzotriazole which is acetylated with acetic anhydride in cold water (5–15° C.) 6-lactylamino-1-(β,γ-dihydroxypropyl)-1,2,3 - benzotriazole can be prepared by treating the corresponding 6-amino compound with α-chloropropionyl chloride in cold water. The α-chloropropionylamino derivative hydrolyzes almost immediately to give the lactylamino compound.

To obtain 1,2,3-[2,3]-naphthotriazoles containing in the 4-position an amino group, at least one hydrogen atom of which is replaced by an aliphatic radical or a furfuryl radical a 2,3-diamino-1-nitronaphthalene is first reacted with nitrous acid according to the method set forth above (Organic Syntheses, 20, 16) to give 4-nitro-1,2,3-[2,3]-naphthotriazole. The nitro derivative is then condensed with an aliphatic or furfuryl organic halide, in the presence of an acid-binding agent, to give a 4-nitro-1,2,3-[2,3]-naphthotriazole containing an aliphatic radical or a furfuryl radical in the 1-position. (This treatment is omitted if compounds containing no substituent in the 1-position are desired.) The resulting 4-nitro derivative is then reduced with hydrogen in the manner described above, at 20 to 25° C., to give the corresponding 4-amino derivative. The 4-amino derivative is then condensed with an aliphatic or furfuryl organic halide to give a 4-amino derivative in which at least one hydrogen atom of the 4-amino group is replaced with an aliphatic radical or a furfuryl radical.

1,2,3-benzotriazole and 1,2,3-[2,3]-naphthotriazole compounds containing an acid ester of phosphorus group can be prepared, for example, by treatment of the corresponding hydroxyalkyl derivative with a suitable phosphating agent. As the manner of introducing acid ester of phosphorus groups is described in the prior art no further discussion as to how these groups can be introduced into the 1,2,3-benzotriazole and 1,2,3-[2,3]-naphthotriazole compounds is believed necessary. Similarly sulfoalkyl and sulfatoalkyl groups, for example, can be introduced into the coupling compounds of our invention by the methods described in the prior art for the introduction of these groups.

The azo compounds of our invention can be employed for the coloration of the materials named herein by the well known methods, employed by those skilled in the art, for the coloration of these materials.

We claim:

1. An azo dye which is represented by the following general formula:

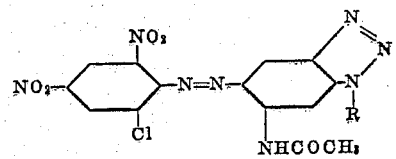

wherein R represents a low carbon hydroxyalkyl group.

2. The azo dye of the following formula:

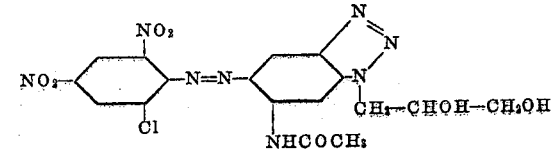

JOSEPH B. DICKEY.
JAMES G. McNALLY.

REFERENCES CITED

The following references are of record in the file of this patent:

UNITED STATES PATENTS

| Number | Name | Date |
|---|---|---|
| 1,043,873 | Scholl | Nov. 12, 1912 |
| 2,109,552 | Schindhelm | Mar. 1, 1938 |
| 2,346,531 | Allen | Apr. 11, 1944 |